United States Patent
Yegnanarayanan et al.

(10) Patent No.: US 6,490,555 B1
(45) Date of Patent: Dec. 3, 2002

(54) DISCRIMINATIVELY TRAINED MIXTURE MODELS IN CONTINUOUS SPEECH RECOGNITION

(75) Inventors: Girija Yegnanarayanan, Bedford, MA (US); Vladimir Sejnoha, Cambridge, MA (US); Ramesh Sarukkai, Billerica, MA (US)

(73) Assignee: ScanSoft, Inc., Peabody, MA (US)

(*) Notice: Subject to any disclaimer, the term of this patent is extended or adjusted under 35 U.S.C. 154(b) by 0 days.

(21) Appl. No.: 09/543,202

(22) Filed: Apr. 5, 2000

Related U.S. Application Data

(63) Continuation-in-part of application No. 08/818,072, filed on Mar. 14, 1997, now Pat. No. 6,260,013.

(51) Int. Cl.$^7$ .............................................. G10L 15/00
(52) U.S. Cl. ...................................................... 704/231
(58) Field of Search ................................ 704/231, 236, 704/238, 240

(56) References Cited

U.S. PATENT DOCUMENTS

| | | | |
|---|---|---|---|
| 4,741,036 A | 4/1988 | Bahl et al. | 381/43 |
| 5,027,406 A | * 6/1991 | Roberts et al. | 704/231 |
| 5,280,563 A | 1/1994 | Ganong | 395/2 |
| 5,388,183 A | 2/1995 | Lynch | 395/2.51 |

(List continued on next page.)

FOREIGN PATENT DOCUMENTS

| | | |
|---|---|---|
| WO | WO01/33551 A1 | 10/2001 |

OTHER PUBLICATIONS

Chesta, C., et al, "Discriminative Training of Hidden Markov Models Using a Classification Measure Criterion", ICASSP 1998, pp. 449–452.

Chow, Yen–Lu, "Maximum Mutual Information Estimation of HMM Parameters or Continuous Speech Recognition Using the N–Best Algorithm", *IEEE*, Ch. 2847, 1990.

Chen, Jung–Kuei, et al, "An N–Best Candidates–Based Discriminative Training for Speech Recognition Applications", *IEEE Transactions on Speech and Audio Processing*, IEEE Inc., New York, US, vol. 2, No. 1, 1994, pp. 206–216.

Valtchev, V., et al, "MMIE Training of Large Vocabulary Recognition Systems", *Speech Communication*, Elsevier Science Publishers, Amsterdam, NL, vol. 22, No. 4., Sep. 1, 1997, pp. 303–314.

EPO, International Search Report dated Sep. 28, 2001 for PCT/IB01/00726.

*Primary Examiner*—Vijay Chawan
*Assistant Examiner*—Michael N. Opsasnick
(74) *Attorney, Agent, or Firm*—Bromberg & Sunstein LLP

(57) ABSTRACT

A method of a continuous speech recognition system is given for discriminatively training hidden Markov for a system recognition vocabulary. An input word phrase is converted into a sequence of representative frames. A correct state sequence alignment with the sequence of representative frames is determined, the correct state sequence alignment corresponding to models of words in the input word phrase. A plurality of incorrect recognition hypotheses is determined representing words in the recognition vocabulary that do not correspond to the input word phrase, each hypothesis being a state sequence based on the word models in the acoustic model database. A correct segment of the correct word model state sequence alignment is selected for discriminative training. A frame segment of frames in the sequence of representative frames is determined that corresponds to the correct segment. An incorrect segment of a state sequence in an incorrect recognition hypothesis is selected, the incorrect segment corresponding to the frame segment. A discriminative adjustment is performed on selected states in the correct segment and the corresponding states in the incorrect segment.

9 Claims, 5 Drawing Sheets

U.S. PATENT DOCUMENTS

| | | |
|---|---|---|
| 5,579,436 A | 11/1996 | Chou et al. ................. 395/2.53 |
| 5,675,706 A * | 10/1997 | Lee et al. .................... 704/254 |
| 5,737,489 A * | 4/1998 | Chou et al. ................. 704/232 |
| 5,832,430 A * | 11/1998 | Lleida et al. ............... 704/231 |
| 5,895,447 A * | 4/1999 | Ittycheriah et al. ......... 704/231 |
| 5,991,720 A * | 11/1999 | Galler et al. ................ 704/251 |
| 6,122,613 A * | 9/2000 | Baker ......................... 704/235 |
| 6,292,778 B1 * | 9/2001 | Sukkar ........................ 704/249 |

\* cited by examiner

DISCRIMINATIVELY TRAINED MIXTURE MODELS IN CONTINUOUS SPEECH RECOGNITION

The present application is a continuation-in-part of application Ser. No. 08/818,072, filed Mar. 14, 1997, now U.S. Pat. No. 6,260,013 and titled "Speech Recognition System Employing Discriminatively Trained Models," the contents of which are incorporated herein by reference.

FIELD OF THE INVENTION

The invention generally relates to automatic speech recognition, and more particularly, to a technique for adjusting the mixture components of hidden Markov models as used in automatic speech recognition.

BACKGROUND ART

The goal of automatic speech recognition (ASR) systems is to determine the lexical identity of spoken utterances. The recognition process, also referred to as classification, begins with the conversion of the acoustical signal into a stream of spectral vectors or frames that describe the important characteristics of the signal at specified times. Classification is attempted by first creating reference models that describe some aspect of the behavior of spectral frames corresponding to different words.

A wide variety of models have been developed, but they all share the property that they describe the temporal characteristics of spectra typical to particular words or sub-word segments. The sequence of spectra arising from an input utterance is compared to such models, and the success with which different models predict the behavior of the input frames determines the putative identity of the utterance.

Currently most systems utilize some variant of a statistical model called the hidden Markov model (HMM). Such models consist of sequences of states connected by arcs, and a probability density function (pdf) associated with each state which describes the likelihood of observing any given spectral vector at that state. A separate set of probabilities determines transitions between states.

Various levels of modeling power are available in the case of the probability densities describing the observed spectra associated with the states of the HMM. There are two major approaches: the discrete pdf and the continuous pdf. With continuous pdfs, parametric functions specify the probability of any arbitrary input spectral vector given a state. The most common class of functions used for this purpose is a mixture of Gaussians, where arbitrary pdfs are modeled by a weighted sum of normal distributions. One drawback of using continuous pdfs is that the designer must make explicit assumptions about the nature of the pdf being modeled—something which can be quite difficult since the true distribution form for the speech signal is not known. In addition, continuous pdf models are computationally far more expensive than discrete pdf models.

The total number of pdfs in a recognition system depends on the number of distinct HMM states, which in turn is determined by type of models used—e.g., phonetic or word models. In many systems the states from different models can be pooled—i.e., the states from different models can share pdfs from a common set or pool. For example, some states from two different models that represent a given phone in different phonetic contexts (i.e., an allophone) may have similar pdfs. In some systems these pdfs will be combined into one, to be shared by both states. This may be done to save memory and in some instances to overcome a problem known as undertraining.

The model pdfs, whether discrete or continuous, are most commonly trained using the maximum likelihood method. In this manner, the model parameters are adjusted so that the likelihood of observing the training data given the model is maximized. However, it is known that this approach does not necessarily lead to the best recognition performance. This realization has led to the development of new training criteria, known as discriminative, the objective of which is to adjust model parameters so as to minimize the number of recognition errors rather than fit the distributions to the data.

FIG. 1 shows a feature vector 10 representative of an input speech frame in a multidimensional vector space, a "correct" state $S_C$ 11 from the model that corresponds to the input speech, and an "incorrect" state $S_I$ 12 from a model that does not correspond to the input speech. As shown in FIG. 1, the vector space distance from the feature vector 10 to the best branch 13 (the closest mixture component) of correct state $S_C$ 11, is very nearly the same as the vector space distance from the feature vector 10 to the best branch 14 of the incorrect state $S_I$ 12. In this situation, there is very little basis at the state level for distinguishing the correct state $S_C$ 11 from the incorrect state $S_I$ 12.

Discriminative training attempts to adjust the best branch 13 of correct state $S_C$ 11 a little closer to the vector space location of feature vector 10, and adjust the best branch 14 of the incorrect state $S_I$ 12 a little farther from the vector space location of feature vector 10. Thus, a future feature vector near the vector space of feature vector 10 will be more likely to be identified with correct state $S_C$ 11 than with incorrect state $S_I$ 12. Of course discriminative training may adjust the vector space of the correct state with respect to multiple incorrect states. Similarly, rather than adjusting the best branches of the states, a set of mixture components within each state may be adjusted.

While discriminative training shows considerable promise, so far it has been applied most successfully to small vocabulary and isolated word recognition tasks. In addition, discriminative training presents a number of new problems, such as how to appropriately smooth the discriminatively trained pdfs, and how to adapt these systems to a new user with a relatively small amount of training data.

U.S. Pat. No. 6,260,013 describes a system using discriminatively trained multi-resolution models in the context of an isolated word recognition system. However, the techniques described therein are not efficiently extensible to a continuous speech recognition system.

SUMMARY OF THE INVENTION

A representative embodiment of the present invention includes a method of a continuous speech recognition system for discriminatively training hidden Markov for a system recognition vocabulary. An input word phrase is converted into a sequence of representative frames. A correct state sequence alignment with the sequence of representative frames is determined, the correct state sequence alignment corresponding to models of words in the input word phrase. A plurality of incorrect recognition hypotheses is determined representing words in the recognition vocabulary that do not correspond to the input word phrase, each hypothesis being a state sequence based on the word models in the acoustic model database. A correct segment of the correct word model state sequence alignment is selected for discriminative training. A frame segment of frames in the sequence of representative frames is determined that corresponds to the correct segment. An incorrect segment of a state sequence in an incorrect recognition hypothesis is selected, the incorrect segment corresponding to the frame segment. A discriminative adjustment is performed on selected states in the correct segment and the corresponding states in the incorrect segment.

In a further embodiment, performing a discriminative adjustment occurs in a batch training mode at the end of a user session with the speech recognition system, and the discriminative adjustment performed on the selected and corresponding states represents a sum of calculated adjustments over the session. Alternatively, performing a discriminative adjustment may occur in an on-line mode in which the selected and corresponding states are discriminatively adjusted for each input word phrase.

Performing a discriminative adjustment may include using a language model weighting of the selected and corresponding states, in which case, when the selected segment of an incorrect recognition hypothesis is a fractional portion of a word model state sequence, the language model weighting for the fractional portion corresponds to the fractional amount of the word model that the fractional portion represents. The discriminative adjustment may include performing a gradient adjustment to selected branches of a selected state in the correct hypothesis model and a corresponding state in the incorrect hypothesis. The gradient adjustment may be to the best branch in each state model.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
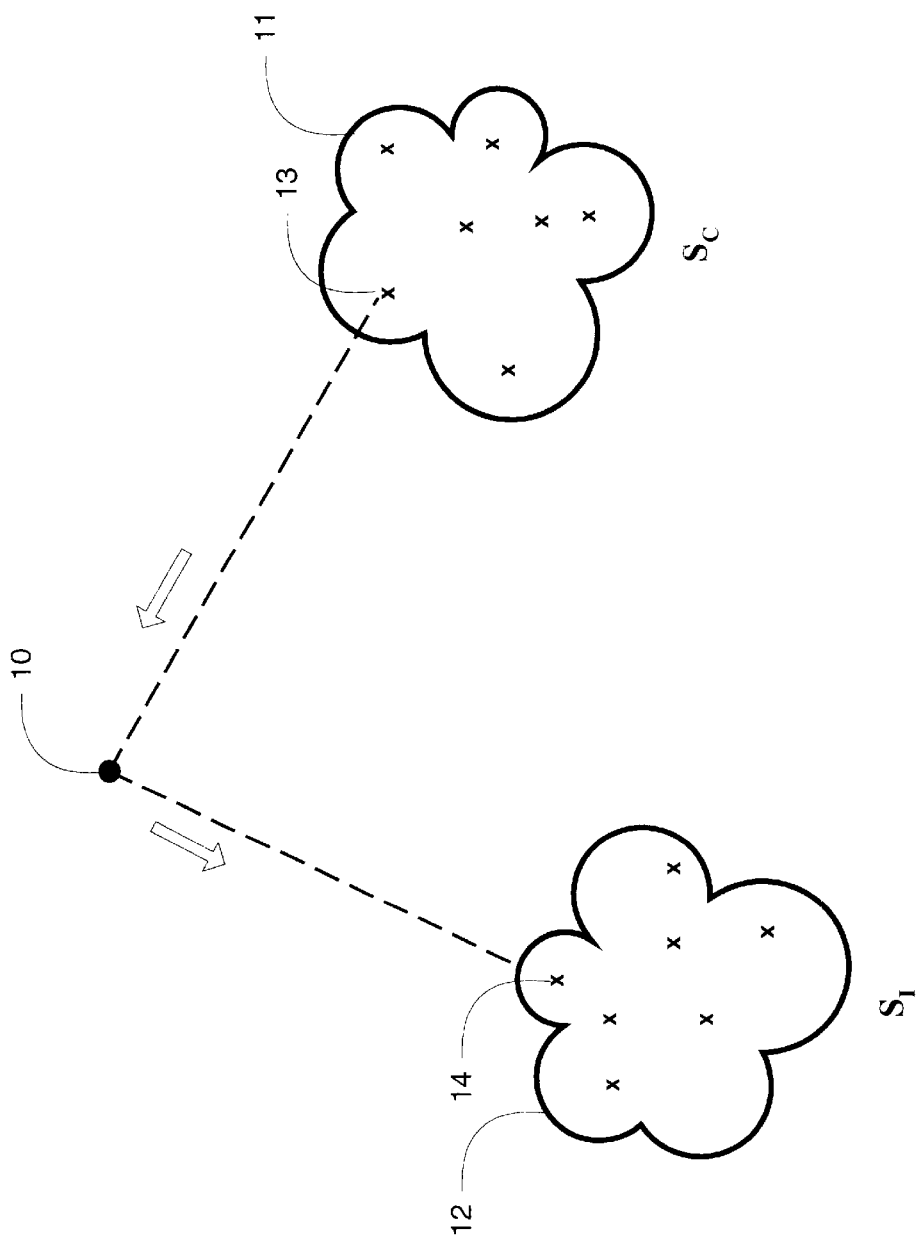
FIG. 1 illustrates the general principle of discriminative training.

In a continuous density pdf using Gaussian mixtures, the standard Gaussian mixture log-probability density function GMLP is described by:

$$GMLP(x(t), s_r) = -\log\left(\sum_{k}^{N(s_r)} a(s_r, k)G(x(t)); \mu(s_r, k); \sum (s_r, k)\right)$$

where $N(s_r)$ is the number of mixture components, $a(s_r,k)$ is the weight of mixture component k is state $s_r$, and $G(x;\mu;\Sigma)$ represents the probability of observing $x(t)$ given a multivariate Gaussian with mean $\mu$ and covariance $\Sigma$.

However, experimental evidence indicates that a computationally simpler form of Gaussian mixture may be employed as the pdf. Using a simpler mixture model not only reduces computational load, but in addition, the resultant reduction in the number of free parameters in the model significantly improves trainability with limited quantities of data. Accordingly, the continuous density log-pdf used in one embodiment may be described by:

$$CDLP(x(f_{i,p}), q_{i,p}) = \min_{1 \leq k \leq N(q_{i,p})} (d(x(f_{i,p}), \mu(q_{i,p}k)))$$

where $$d\left(x(f_{i,p}), \mu(q_{i,p})\right) = \sum_{l=1}^{24} (x(f_{i,p}) - \mu(q_{i,p}, k, l))^2$$

Thus, the continuous pdf model for state $q_{i,p}$ consists of $N(q_{i,p})$ 24-dimensional mean vectors $\mu$. Due to the lack of normalizing terms, the CDLP is not a true log-probability.

The score for a path corresponding to an alignment of the input utterance with a reference model i is given by:

$$D_i = \frac{1}{P_i} \sum_{p=1}^{P_i} CDLP(x(f_{i,p}), q_{i,p})$$

The first step in the training of the continuous density pdfs is the initialization of the mean vectors $\mu_{s_r,k}$. This can be done by training a conventional maximum likelihood Gaussian mixture pdf for each model state from the input utterance frames aligned with that state using a discrete pdf component of the models. The total number of mean vectors can be set to reflect the variance of the data frames aligned with each state during the iterative training. Upon convergence of the initial training, the mean vectors with significant probabilities are retained, while all other parameters associated with a standard Gaussian mixture model are discarded.

The next step consists of the discriminative training of the mean vectors. This is accomplished by defining an appropriate training objective function that reflects recognition error rate, and optimizing the mean parameters so as to minimize this function. One common technique applicable to the minimization of the objective function is gradient descent optimization. Gradient descent optimization is described, for example, in D. E. Rumelhart et al., *Parallel Distributed Processing*, Vol. 1, pp. 322–28, MIT Press, the contents of which are incorporated herein by reference. In this approach, the objective function is differentiated with respect to the model parameters, and the parameters are then modified by the addition of the scaled gradient. A new gradient that reflects the modified parameters is then computed, and the parameters are adjusted further. The iteration is continued until convergence is attained, usually determined by monitoring the performance on evaluation data independent from the training data.

A training database is preprocessed by obtaining for each training utterance a short list of candidate recognition models. In an isolated word speech recognition system, these lists would be of single word models, whereas in a continuous speech recognition system, such a list would contain descriptions of model sequences. U.S. Pat. No. 5,386,492 to Wilson et al., incorporated herein by reference, describes one particular approach to generating a small set of candidate models for isolated word speech inputs. Each candidate list thus contains some number of correct models (subset C), and a number of incorrect models (subset I). Each list is sorted by the score $D_i$, and an augmented alignment path structure is retained for each reference model in the list. The additional stored path information is as follows:

$$b_i = (b_{i,1}, \ldots, b_{i,p}, \ldots b_{i,P_i})$$

where $b_i$ is used to store the index of the best mean vector at a particular path point. For example, if p connects the frame $x(f_{i,p})$ and state $q_{i,j}$, then $$b_{i,p} = \arg\min_{1 \le k \le N(q_{i-p})} (d(x(f_{i,p}), \mu(q_{i,p}, k)))$$

An error function $\epsilon_u$ for a particular training utterance u is computed from the pair-wise error functions $o_{i,j}$:

$$\varepsilon_u = \frac{1}{2} \sum_{i \in C} \sum_{j \in I} o_{i,j}^2$$

where $o_{i,j} = (1+e^{-\beta(D_i - D_j)})^{-1}$, $\beta$ is a scalar multiplier, $D_i$ is the alignment score of the input token and a correct model $j \in C$, and $D_j$ is the alignment score of the input token and incorrect model $j \in I$. The sizes of the sets C and I can be controlled to determine how many correct models and incorrect or potential intruder models are used in the training.

Error function $o_{i,j}$ takes on values near 1 when the correct model score $D_i$ is much greater (i.e., worse) than the intruder score $D_j$, and near 0 when the converse is true. Values of $o_{i,j}$ greater than 0.5 represent recognition errors, while values less than 0.5 represent correct recognitions. The scalar multiplier parameter $\beta$ controls the influence of "near-errors" on the training.

As previously described, the score $D_i$ between the utterance and the target model i is obtained by scoring the alignment path:

$$D_i = \frac{1}{P_i} \sum_{p=1}^{P_i} CDLP(x(f_{i,p}), q_{i,p})$$

which can be rewritten as:

$$D_i = \sum_{p=1}^{P_i} d(x(f_{i,p}), \mu(q_{i,p}, b_{i,p}))$$

A similar expression can be written for $D_j$. Differentiating the error function with respect to a particular component of the mean vector $\mu(s, k, 1)$ yields:

$$-\frac{\partial \varepsilon_u}{\partial \mu(s, k, l)} = 2\beta \sum_{i \in C} \sum_{j \in I} o_{i,j}^2 (1 - o_{i,j})$$

$$\left\{ \sum_{p}^{P_i} (x(f_{i,p}, l) - \mu(q_{i,p}, b_{i,p}, l)\delta(s, q_{i,p})\delta(k, b_{i,p})) - \sum_{p}^{P_j} (x(f_{j,p}, l) - \mu(q_{j,p}, b_{j,p}, l)\delta(s, q_{j,p})\delta(k, b_{j,p})) \right\}$$

where $\delta(a,b)$ is the Kronecker delta and equals 1 if a=b, and 0 otherwise.

For batch mode processing, the gradient is averaged over all utterances and correct-incorrect pairs:

$$\Delta \mu(s, k, l) = \frac{1}{U} \sum_u \frac{1}{N_{C,I,u}} \cdot \frac{-\partial \varepsilon_u}{\partial \mu(s, k, l)}$$

where $N_{C,I,u}$ is the number of correct-incorrect model pairs for utterance u. The mean components are modified by the addition of the scaled gradient:

$$\hat{\mu}(s,k,l) = \mu(s,k,l) + w\Delta\mu(s,k,l)$$

where w is a weight which determines the magnitude of the change to the parameter set in one iteration.

In each iteration of batch mode discriminative training, all training utterances are processed before any model parameters are adjusted. This is typical of the initial enrollment session when a user first creates a personal speaker profile in a speech recognition system. It is also possible to perform on-line training of the model parameters using an adaptive algorithm where the models are adjusted after each training utterance has been processed. This mode is typical of a user correcting and retraining the recognition models during normal use.

Like batch training, on-line training requires the computation of an error function gradient for all current model parameters specified by the correct and incorrect alignment paths in the candidate set for a particular input utterance u. However, unlike batch training, the gradient is not accumulated, but is applied immediately to the model parameters:

$$\hat{\mu}(s,k,l)_u = \mu(s,k,l)_{u-1} + w'\Delta_u \mu(s,k,l)_{u-1}$$

The notation $\Delta_u$ means that the utterance u is used to compute the gradient, and the operation is performed on the current model $\mu(s,k,l)_{u-1}$, which was presumably adapted on the previous utterance u−1. In the case of on-line training, w'<<w (the weight used in batch-mode training) since the reliability of the change estimated from a single utterance is considerably lower than the estimate from a complete training set. Because the recognition engine does not operate perfectly, it is useful to include provisions for undoing an on-line gradient adjustment such as is described, for example, in co-pending application Ser. No. 08/818,072.

The foregoing would be sufficient to implement discriminative training to the models in an isolated word speech recognition system. However, continuous speech recognition systems generate multiple recognition hypotheses that complicate attempts to discriminatively train model states. Accordingly, before describing discriminative training in a continuous speech recognition system, the techniques for handling such multiple recognition hypotheses will be described.

Figure 2:
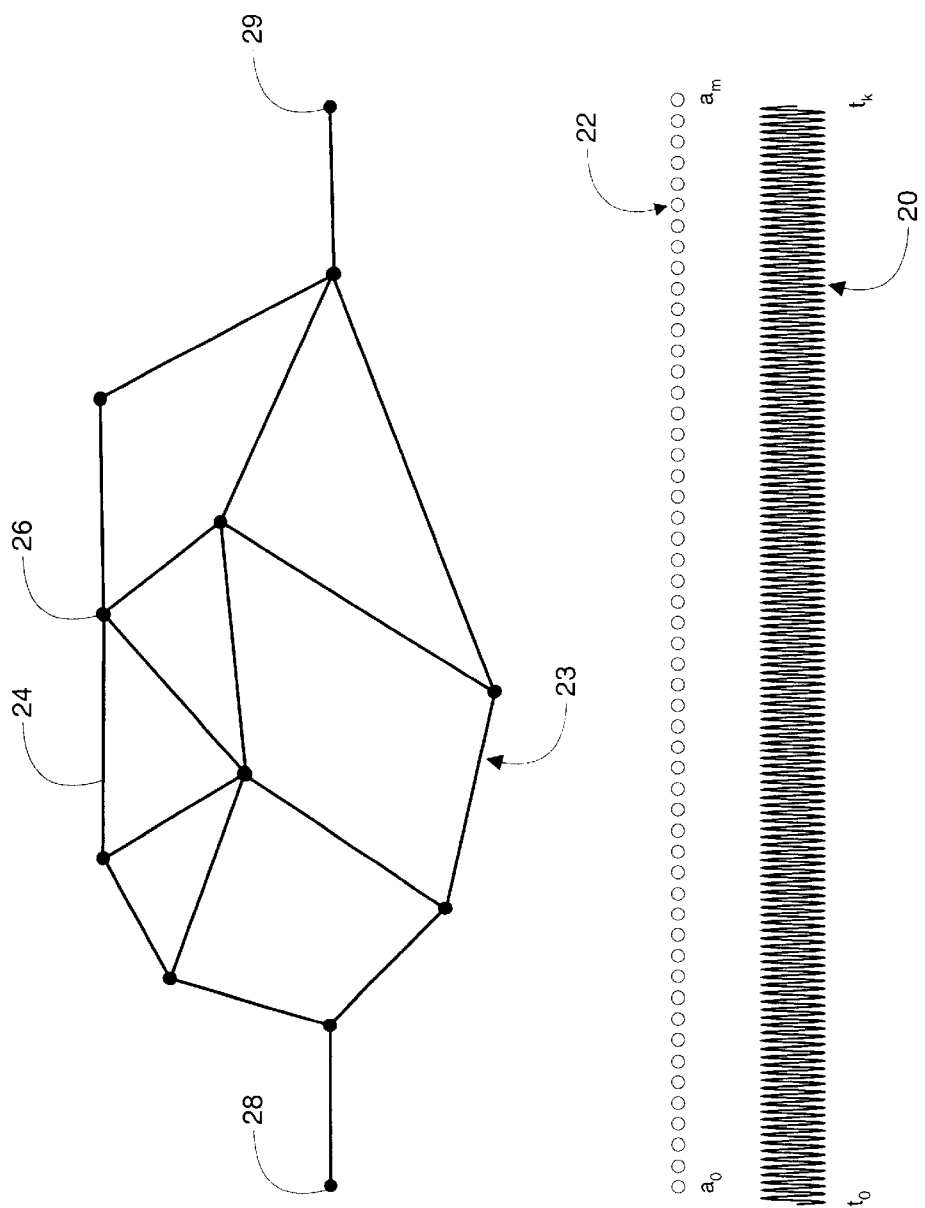
FIG. 2 illustrate an acoustic output network of recognition hypotheses in a continuous speech recognition system.

As shown in FIG. 2, a continuous speech recognition system takes an input utterance 20, segments it into a sequence a frame vectors 22, and generates an acoustic output network (AON) 23 representing multiple recognition hypotheses that could correspond to the input utterance. In AON 23, the horizontal axis is time, and each node 26 represents a given word while each arc 24 represents the path to that word from the preceding word.

AON 23 is a compact and efficient arc-node data structure performing multiple functions. A primary functionality of the AON 23 is to contain the recognizer's best hypotheses in terms of sequences of words or "pronunciation models," and to store information about the various possible "connection" times of the models in each sequence. Preferably, the respective acoustic and language model scores at these connection points are stored so it is relatively easy to compute the composite scores of complete paths for each sentence hypothesis. It is also desirable to store all the possible "path" segments through the individual models, given these connection times, such that the "path" or "speech frame/model state alignment" may be computed for a given hypothesis.

Figure 6:
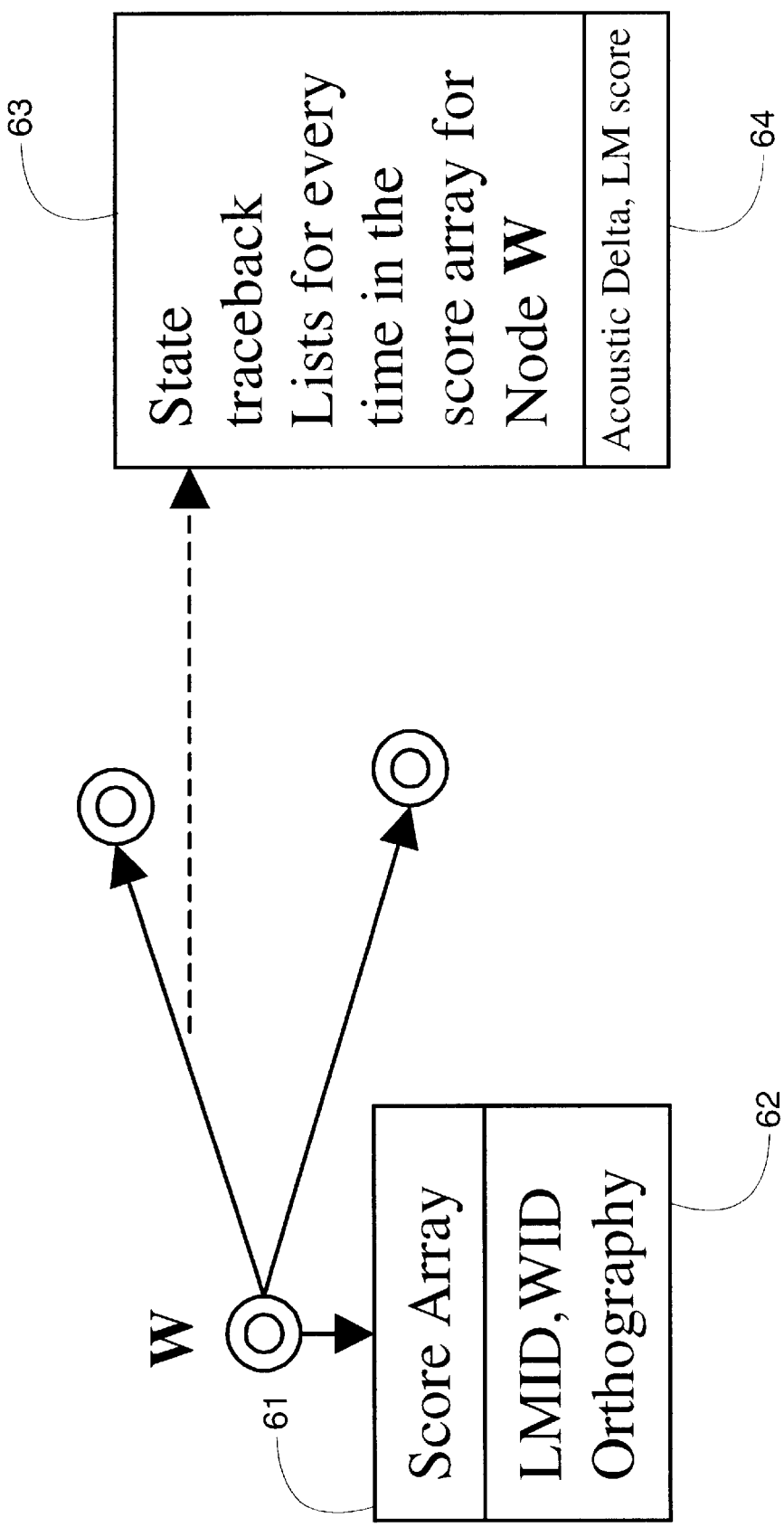
FIG. 6 illustrate structural details of a node and arc in an acoustic output network.

In one specific embodiment, there is associated with each AON node 26 a score array, 61 in FIG. 6, that contains acoustics scores only, and the word identity and the language model identity in addition to orthographies 62. Associated with each arc 24 is a state trace back structure 63 for each time in the score array, and acoustic delta and bigram scores 64. In one embodiment, a global acoustic delta from the best path is also kept for each arc 24. The start and end phone orthographies of the word are stored at every arc 24. Local acoustic scores and language model scores should be accessible at every arc 24, and the time information is also useful for fast maximum likelihood enrollment. The AON 23 may also contain extraction functions for the top N hypotheses. The best score of any hypotheses going through a given node 24 may also be stored in the AON 23, for efficiency reasons, to speed up certain implementations of a top N discriminative algorithm.

For a given input utterance 20, a correct path may be determined by constrained recognition or forced alignment of the input frames 22 against a sequence of correct word models. As an optimization for discriminative training, partial constrained recognition may be performed when the user corrects only a part of an utterance. In such a case, the frame sequence that was assigned to the original recognition word sequence is aligned against the correct word sequence. For the rest of the utterance (i.e., the part that is not corrected by the user), the alignment and path obtained from the AON 23 may be used. The correct path co-exists with the AON 23 (outside of the AON) irrespective of whether it is already present in the AON. One embodiment utilizes a structure called an "Extended AON or EAON" which contains the correct path information as well as the recognition output. Once a "correct" alignment is obtained, for each arc in the EAON and for all valid paths through the arc, the time segmentation of the path is compared with the corresponding word or words spanning the same time in the correct model sequence. If the word represented by the arc is found in the correct word sequence in the specified time span, then the arc may be marked as "correct".

In a further embodiment, it may be desirable to generate more alternate hypotheses than a normal recognizer might produce. This approach penalizes the "correct" words so that there is a bias against them appearing in the AON 23. Thus, more "incorrect" candidates may be generated for discrimination training. Such a technique of artificially generating more "incorrect"s may be especially advantageous for speaker independent batch training of the state mixture models.

Given the preceding discussion of continuous speech recognition and AONs, we may now consider how to apply discriminative training to the word model states. Discriminative training tries to learn from a set of training utterances information that is relevant to discriminating between correct and incorrect models. In representative embodiments, the information thus learned is applied the mixture model means that may be used in recognition for computing the distance or the scores between the input frames and acoustic model states.

A general discriminative training approach starts by obtaining the "correct" alignment of an input utterance with the correct models or pronunciations, via constrained recognition. Various possible alternate candidates and alignments are also obtained from normal recognition. These two requirements are satisfied by forming an EAON as previously described. Then, a set of alternate candidates from which to learn discrimination information is selected. Scores for the correct and incorrect components for some common input segment are computed, along with weights for learning discrimination information based on these scores. Gradient vectors are computed based on the above alignments and weights, and the gradient vectors are added to the mixture model means to update the mixture models.

Figure 3:
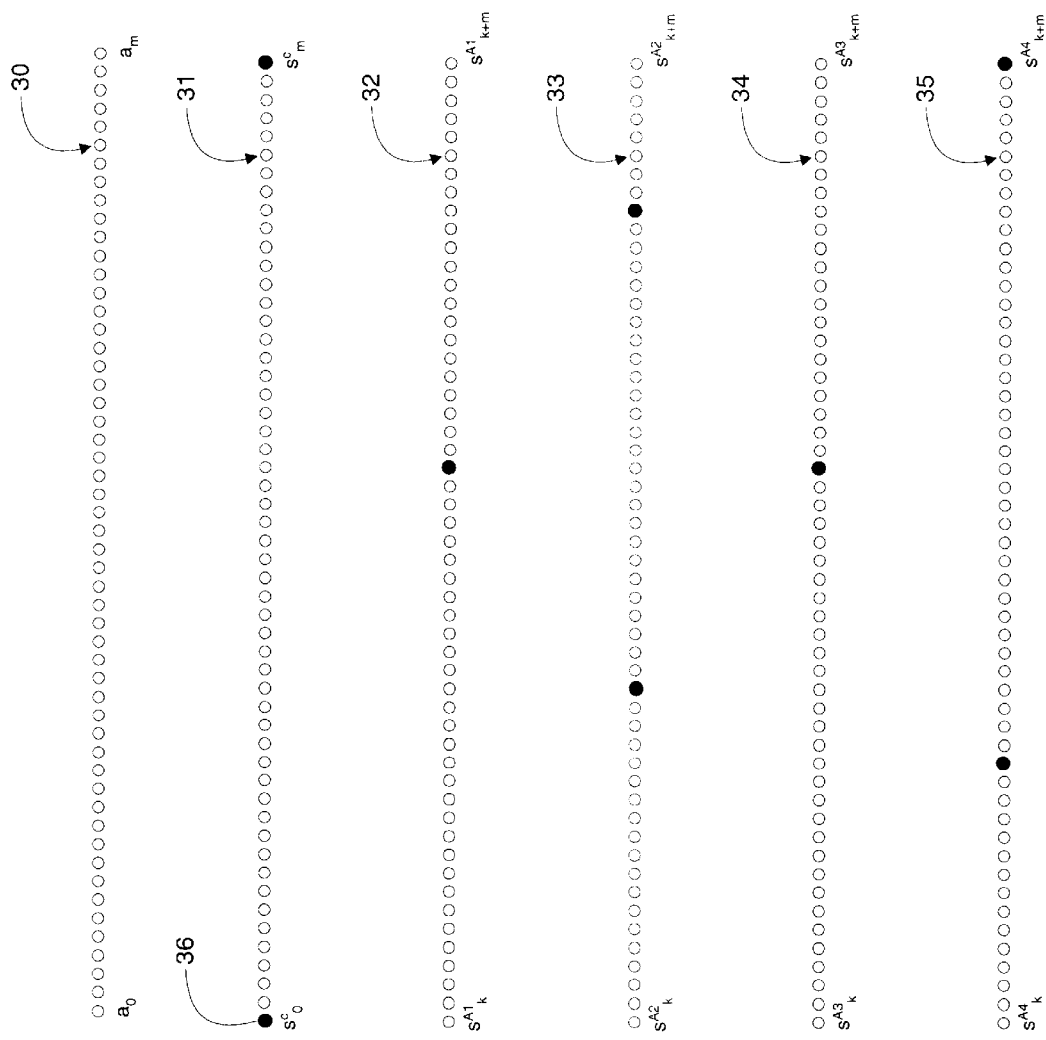
FIG. 3 illustrates state sequences of the correct recognition model and various alternate recognition models with respect to the input frames.

As shown in FIG. 3, a given correct word recognition model 31 will be a sequence of model states beginning with an initial state $S_0^C$ and a final state $S_m^C$. Each non-null state in correct word recognition model 31 is aligned with and corresponds to the acoustic frame vertically above it in the input sequence of frames $30 a_0$ to $a_m$. In FIG. 3, the black filling in the initial and final states of the correct recognition model 31 indicates word boundaries. FIG. 3 also illustrates state sequences for four alternate recognition hypotheses A1 32, A2 33, A3 34, and A4 35. The black filling of various states in the alternate recognition hypotheses represents word boundaries.

As can be seen by the location of the word boundaries shown in FIG. 3, the states in the alternate recognition hypotheses that correspond to the input sequence of frames 30 $a_0$ to $a_m$ that is represented by the correct word recognition model 31 may represent a non-integral portion of one or more words. It is not intuitively clear under the circumstances how to account for this effect in calculating discriminative training adjustments to the states.

Figure 4:
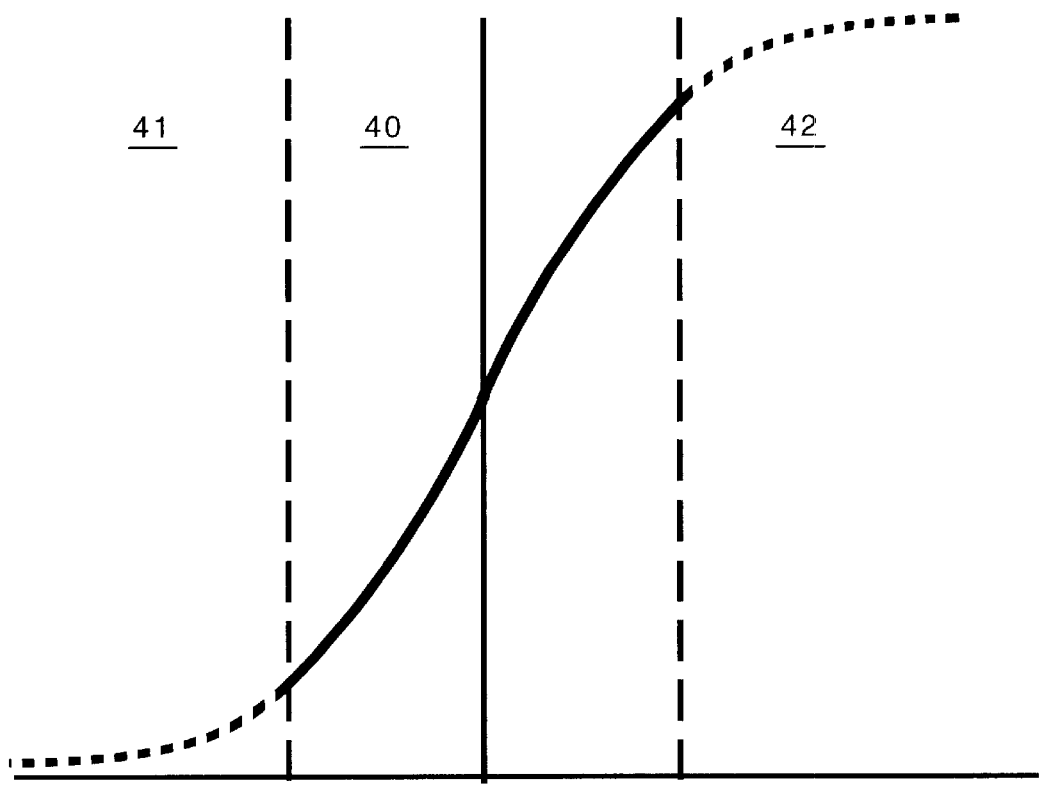
FIG. 4 illustrates the cost function for determining discriminative adjustments in one embodiment of the present invention.

FIG. 4 shows the shape of the cost function used in one embodiment. The shape of the function is basically that of a sigmoid function, i.e., where:

$$f(x) = \frac{1}{1+e^{-ax}}$$

To the left of FIG. 4 is region 41 where the correct models are already highly accurate-no discriminative training is needed. To the right in FIG. 4 is region 42 where the incorrect models are much closer to the input signal than the correct model-in this case, the correct models are too far away from the input signal (for whatever reason) to benefit from discriminative training. In the center of FIG. 4 is region 40 where the correct and incorrect models are both relatively close to the input signal-this is where discriminative training of the models will have the greatest beneficial effect on subsequent system performance.

Figure 5:
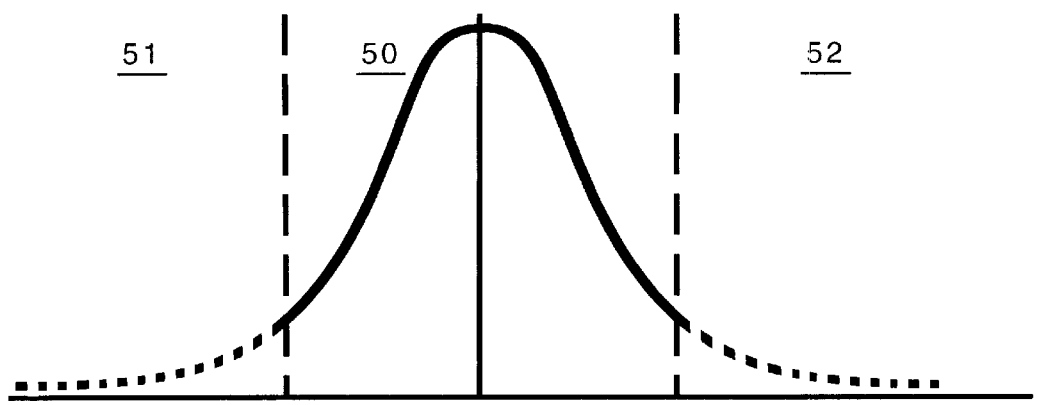
FIG. 5 illustrates the discriminative training weighting function for the cost function of FIG. 4.

FIG. 5 shows the weighting function resulting from taking the derivative of the sigmoid shaped cost function of FIG. 4. Since regions 41 and 42, as explained above, do present good candidates for discriminative training, in corresponding regions 51 and 52 of FIG. 5 the weighting function is not defined. In the center region 50 the weighting function is greatest where the correct and incorrect models are closest to each other (i.e., at the vertical axis. In alternative embodiments the cost and weighting functions may be shaped differently. For example, a linear weighting function may be advantageous which increases steadily the further the cost function is from the correct model.

In one specific embodiment, the selection of alternate recognition candidates for discriminative training starts by collecting all "valid" arcs from an AON. Valid paths are those that form part of a complete hypothesis through the AON from the initial noise through the final noise, and valid arcs are those that contain at least one path which is part of a valid hypothesis. All valid arcs marked as "correct" are then discarded. For each "incorrect" arc, one or more valid (and unique) paths are collected as an incorrect path. That is, if the same path forms a part of many complete hypotheses, it is only stored once. Then, for each such incorrect path, the local scores are computed and normalized by the path length. The scores may be either mixture model acoustic scores only, or a composite combination of acoustics scores and language model scores. Where segments span partial words, the language model scores may be adjusted to reflect the number of frames considered. Also, the language model scores may be weighted, for example, on a scale of 0 to 1 where 0 is a purely acoustic score.

This list of incorrect paths is sorted according to the normalized acoustic or composite scores (lowest first). For each candidate on the above list, that candidate and the best N other paths which start within a time window of T frames of the candidate are chosen for discriminative training.

Once a set of alternate recognition candidates is selected for discriminative training, the "correct" and "alternate" scores and weights need to be computed. For each such incorrect path above, the corresponding path from the correct path may be extracted and the mixture model acoustic score and language model score are computed. The weights may then be computed from the correct and incorrect candidate scores, according to a predefined weighting function. This gives the weight as a function of the length normalized score difference between the correct and corresponding incorrect/alternate path segment.

Computation of mean gradients may be performed once the correct and incorrect path segments are available. A delta vector (differences in channel values between the state-mean, frame pair) may be calculated and weighted using the above weights. Differences are positive if they come from the "correct" alignment and are negative if they come from the "incorrect" alignment. In one embodiment, if the correct and incorrect paths contain the same state for a given frame, then only the positive channel deltas from the correct segment are computed and used in discriminative training. In another embodiment, for such shared states, the positive and negative contributions cancel out.

Where a correct model and an incorrect alternative model share some states, it may be desirable to ignore such shared states for purposes of discriminative training. This choice avoids a swamping effect from such shared states.

It is preferred to first select those alternate models that have the most potential for discrimination to avoid having to process a large number of alternates per interval that have relatively little impact. For instance, it may desirable to sort the alternate models by normalized delta scores rather than by normalized individual scores.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of a continuous speech recognition system for discriminatively training hidden Markov models for a system recognition vocabulary, the method comprising:
    converting an input word phrase into a sequence of representative frames;
    determining a correct state sequence alignment with the sequence of representative frames, the correct state sequence alignment corresponding to models of words in the input word phrase;
    determining a plurality of incorrect recognition hypotheses representing words in the recognition vocabulary that do not correspond to the input word phrase, each hypothesis being a state sequence based on the word models in an acoustic model database;
    selecting a correct segment of the correct word model state sequence alignment for discriminative training;
    determining a frame segment of frames in the sequence of representative frames that corresponds to the correct segment;
    selecting an incorrect segment of a state sequence in an incorrect recognition hypothesis, the incorrect segment corresponding to the frame segment;
    performing a discriminative adjustment on selected states in the correct segment and the corresponding states in the incorrect segment.

2. A method according to claim 1, wherein performing a discriminative adjustment occurs in a batch training mode at the end of a user session with the speech recognition system, and the discriminative adjustment performed on the selected and corresponding states represents a sum of calculated adjustments over the session.

3. A method according to claim 1, wherein performing a discriminative adjustment occurs in an on-line mode in which the selected and corresponding states are discriminatively adjusted for each input word phrase.

4. A method according to claim 1, wherein performing a discriminative adjustment includes using a language model weighting of the selected and corresponding states.

5. A method according to claim 4, wherein when the selected segment of an incorrect recognition hypothesis is a fractional portion of a word model state sequence, the language model weighting for the fractional portion corresponds to the fractional amount of the word model that the fractional portion represents.

6. A method according to claim 1, wherein the discriminative adjustment includes performing a gradient adjustment to selected branches of a selected state in the correct hypothesis model and a corresponding state in the incorrect hypothesis.

7. A method according to claim 6, wherein the gradient adjustment is to the best branch in each state model.

8. A method according to claim 1, wherein the hidden Markov models are speaker independent models.

9. A method according to claim 1, wherein the hidden Markov models are speaker dependent models.

* * * * *